United States Patent
Son et al.

(10) Patent No.: US 8,899,394 B2
(45) Date of Patent: Dec. 2, 2014

(54) HYDRAULIC CONTROL APPARATUS FOR HYDRAULIC TORQUE CONVERTER

(71) Applicants: Hyundai Motor Company, Seoul (KR); Kia Motors Corporation, Seoul (KR)

(72) Inventors: Hyunjun Son, Hwaseong-si (KR); Joo Hang Lee, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 123 days.

(21) Appl. No.: 13/728,070

(22) Filed: Dec. 27, 2012

(65) Prior Publication Data

US 2014/0097056 A1    Apr. 10, 2014

(30) Foreign Application Priority Data

Sep. 3, 2012  (KR) .................. 10-2012-0097310

(51) Int. Cl.
  *F16H 45/02* (2006.01)
  *F16H 61/14* (2006.01)

(52) U.S. Cl.
  CPC .............. *F16H 45/02* (2013.01); *F16H 61/143* (2013.01)
  USPC ...................... 192/3.29; 192/85.63

(58) Field of Classification Search
  None
  See application file for complete search history.

(56) References Cited

U.S. PATENT DOCUMENTS

| 5,669,475 A | 9/1997 | Matsuoka |
| 6,662,918 B2 | 12/2003 | Takeuchi et al. |
| 2010/0282558 A1* | 11/2010 | Ishiwada et al. ............. 192/3.29 |
| 2012/0000740 A1* | 1/2012 | Shimizu et al. ............ 192/85.63 |

FOREIGN PATENT DOCUMENTS

| JP | 09-032916 B2 | 2/1997 |
| JP | 2003-065421 B2 | 3/2003 |
| JP | 2011-106552 A | 6/2011 |
| KR | 0153105 B1 | 10/1998 |
| KR | 10-0302717 B1 | 12/2001 |

\* cited by examiner

*Primary Examiner* — Rodney H Bonck
(74) *Attorney, Agent, or Firm* — Morgan, Lewis & Bockius LLP

(57) ABSTRACT

A hydraulic control apparatus may be provided with a lock-up clutch operated or not by hydraulic pressure difference between an engagement-side oil chamber and a disengagement-side oil chamber and may include a first hydraulic line supplying hydraulic pressure to the disengagement-side oil chamber or exhausting the hydraulic pressure from the disengagement-side oil chamber, a second hydraulic line supplying hydraulic pressure to the engagement-side oil chamber or exhausting the hydraulic pressure from the engagement-side oil chamber, and a third hydraulic line connected to a slip switch valve, and selectively exhausting through the slip switch valve the hydraulic pressure supplied to the engagement-side oil chamber.

11 Claims, 4 Drawing Sheets

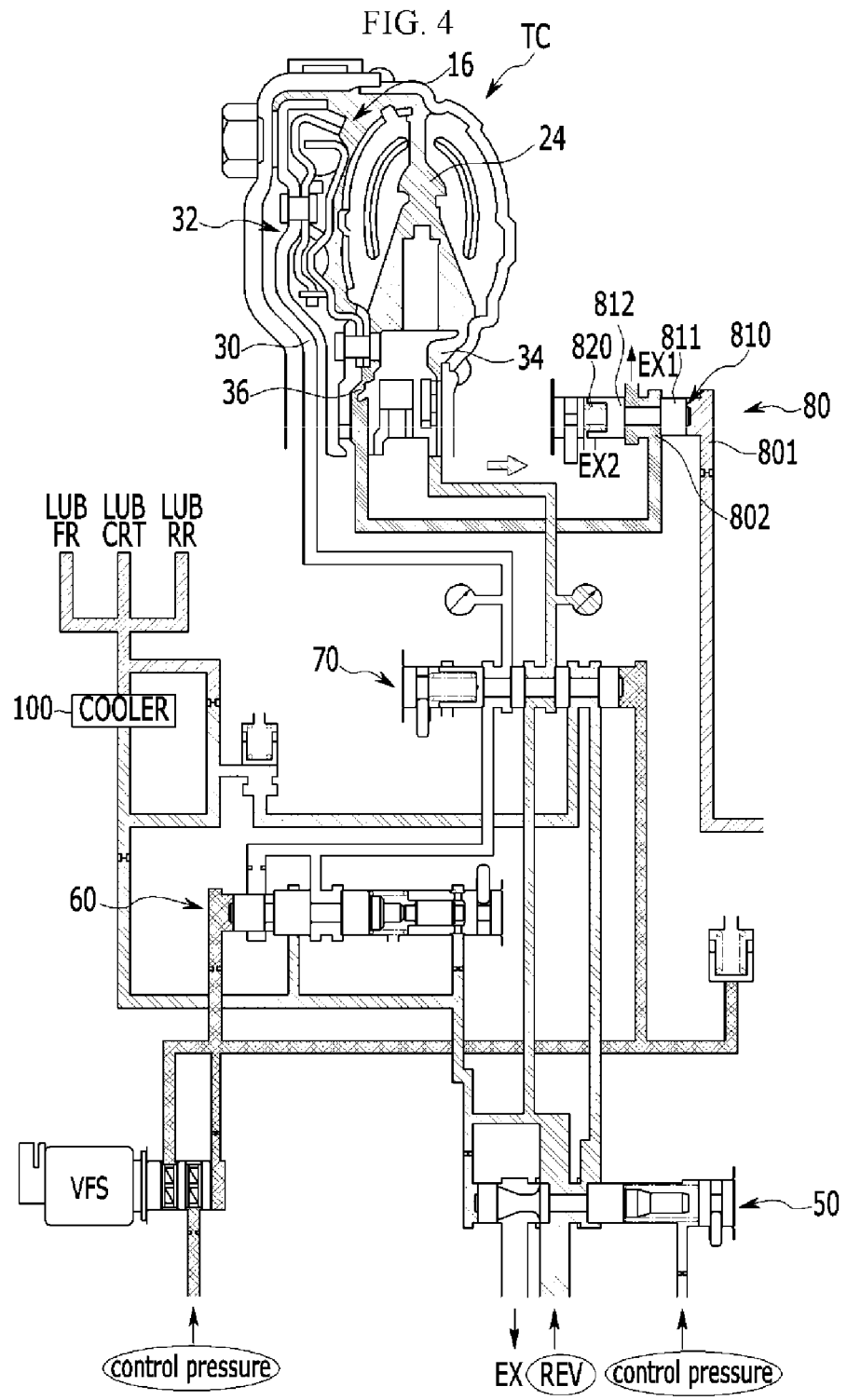

HYDRAULIC CONTROL APPARATUS FOR HYDRAULIC TORQUE CONVERTER

CROSS-REFERENCE TO RELATED APPLICATION

The present application claims priority to Korean Patent Application No. 10-2012-0097310 filed on Sep. 3, 2012, the entire contents of which is incorporated herein for all purposes by this reference.

BACKGROUND OF THE INVENTION

1. Field of the Invention

The present invention relates to a hydraulic control apparatus for a hydraulic torque converter applicable to an automatic transmission for a vehicle. More particularly, the present invention relates to a hydraulic control apparatus for a hydraulic torque converter which improves cooling effect by recirculating fluid when slip start for operating a lock-up clutch (lock-up on) provided in a torque converter.

2. Description of Related Art

A torque converter applied to a vehicle includes a lock-up clutch for directly and mechanically transmitting torque.

The lock-up clutch is disposed between a front cover being an input-side rotation member of the torque converter and a turbine being an output-side rotation member of the torque converter.

A space between the front cover and the turbine is divided into a disengagement-side oil chamber close to the front cover and an engagement-side oil chamber close to the turbine.

Therefore, the lock-up clutch is operated or not by difference between hydraulic pressure of the disengagement-side oil chamber and hydraulic pressure of the engagement-side oil chamber.

That is, if fluid in the disengagement-side oil chamber is drained and fluid is supplied to the engagement-side oil chamber, the hydraulic pressure of the engagement-side oil chamber increases compared with the disengagement-side oil chamber. Therefore, a friction member of the lock-up clutch is coupled to the front cover by friction.

When operating the lock-up clutch, if friction coupling force of the lock-up clutch increases, the lock-up clutch is completely coupled to the front cover by friction. This state is called lock-up on state of the lock-up clutch.

At this time, if hydraulic pressure difference between the disengagement-side oil chamber and the engagement-side oil chamber is reduced by supplying fluid to the disengagement-side oil chamber, the lock-up clutch begins to slip.

If the lock-up clutch slips frequently, frictional heat may occur due to slip and durability of the friction member may be deteriorated due to thermal-degradation.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hydraulic control apparatus for a hydraulic torque converter having advantages of suppressing temperature rise of oil by circulating fluid when slip start of a lock-up clutch. Therefore, durability of the lock-up clutch may be improved and operation of the lock-up clutch may be controlled suitably.

In an aspect of the present invention, a hydraulic control apparatus for a hydraulic torque converter which is provided with a lock-up clutch operated or not by hydraulic pressure difference between an engagement-side oil chamber and a disengagement-side oil chamber may include a first hydraulic line supplying hydraulic pressure to the disengagement-side oil chamber or exhausting the hydraulic pressure from the disengagement-side oil chamber, a second hydraulic line supplying hydraulic pressure to the engagement-side oil chamber or exhausting the hydraulic pressure from the engagement-side oil chamber, and a third hydraulic line connected to a slip switch valve, and selectively exhausting through the slip switch valve the hydraulic pressure supplied to the engagement-side oil chamber.

The slip switch valve is configured to switch hydraulic line by moving a valve spool by control pressure of an on/off solenoid valve.

The slip switch valve may include a valve body provided with a first port receiving the control pressure from the on/off solenoid valve, a second port connected to the third hydraulic line of the engagement-side oil chamber, a first exhaust port selectively exhausting the hydraulic pressure supplied to the second port, and a second exhaust port exhausting the hydraulic pressure leaking from the slip switch valve, and a valve spool provided with a first land to which the control pressure supplied to the first port is applied, a second land selectively opening or closing the first exhaust port, and an elastic member disposed between the second land and the valve body and elastically biasing the valve spool toward the first port.

The hydraulic control apparatus may include a torque converter control valve receiving drive pressure from a regulator valve, a lock-up clutch switch valve supplying the drive pressure supplied from the torque converter control valve selectively to the engagement-side oil chamber through the second hydraulic line or the disengagement-side oil chamber through the first hydraulic line, and a cooler cooling the hydraulic pressure.

The drive pressure of the regulator valve is supplied to the disengagement-side oil chamber through the torque converter control valve, the lock-up clutch switch valve, and the first hydraulic line in a lock-up off state of the lock-up clutch.

A portion of the hydraulic pressure supplied to the disengagement-side oil chamber is exhausted through the second hydraulic line so as to be recirculated to the cooler through the lock-up clutch switch valve.

A portion of the hydraulic pressure supplied to the disengagement-side oil chamber is supplied to the slip switch valve through the third hydraulic line, but is not exhausted through the slip switch valve.

The drive pressure of the regulator valve is supplied to the engagement-side oil chamber through the torque converter control valve, the lock-up clutch switch valve, and the second hydraulic line in a lock-up on state or a slip start state of the lock-up clutch.

Hydraulic pressure for lubrication is supplied directly from the lock-up clutch switch valve to the cooler in the lock-up on state of the lock-up clutch.

A portion of the hydraulic pressure supplied to the engagement-side oil chamber is supplied to the slip switch valve through the third hydraulic line, but is not exhausted through the slip switch valve in the lock-up on state of the lock-up clutch.

A portion of the hydraulic pressure supplied to the engagement-side oil chamber is supplied to the slip switch valve through the third hydraulic line, and is then exhausted through the slip switch valve in the slip start state of the lock-up clutch.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 is a schematic diagram illustrating a slip start state of a lock-up clutch in a hydraulic control apparatus of an exemplary embodiment of the present invention.

Figure 1:
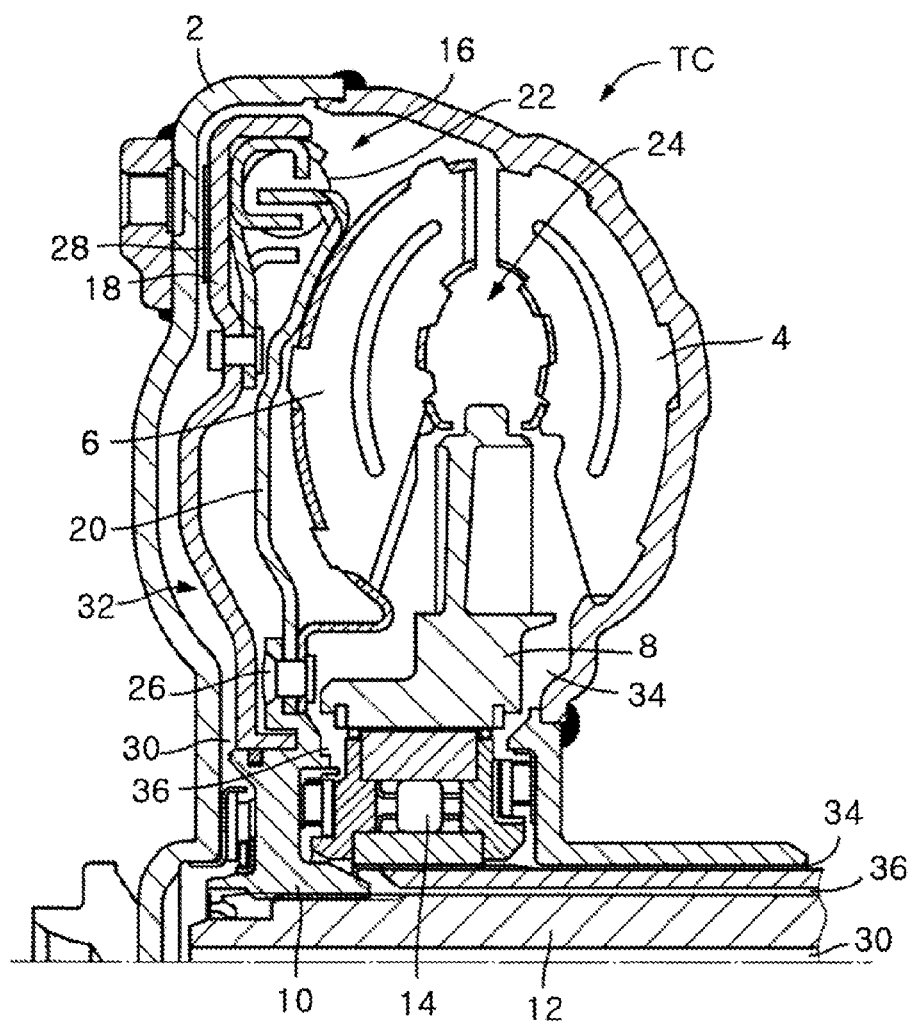
FIG. 1 is a cross-sectional view of a torque converter to which an exemplary embodiment of the present invention is applicable.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a cross-sectional view of a torque converter to which an exemplary embodiment of the present invention is applicable.

Referring to FIG. 1, a torque converter TC includes a front cover 2, an impeller 4, a turbine 6, and a stator 8.

The front cover 2 is connected to a crankshaft of an engine so as to rotate with the engine.

The impeller 4 is connected to the front cover 2 so as to rotate with the front cover 2.

The turbine 6 is disposed to face the impeller 4, and is rotated by fluid supplied from the impeller 4 so as to drive a driven shaft 12 that is an input shaft of a transmission through a turbine hub 10.

The stator 8 is disposed between the impeller 4 and the turbine 6, and is adapted to rotate only in one direction by a one-way clutch 14. The stator 8 changes flow direction of fluid (automatic transmission oil) flowing out from the turbine 6 and delivers the fluid to the impeller 4.

The stator 8 has the same rotation axis as the front cover 2.

In addition, a lock-up clutch 16 for directly connecting the engine with the transmission is disposed between the front cover 2 and the turbine 6.

The lock-up clutch 16 includes a clutch piston 18, a damper 20, and a coil spring 22.

The clutch piston 18 is disposed between the turbine 6 and the front cover 2, and is movable toward the front cover 2 or away from the front cover 2.

In addition, an engagement-side oil chamber 24 is formed in a space between the clutch piston 18 and the impeller 4 (that is, the space between the impeller 4 being an input element and the turbine 6 being an output element).

The damper 20 is disposed between the clutch piston 18 and the turbine 6, and an internal circumferential portion of the damper 20 is fixed to the turbine 6 and the turbine hub 10 by a rivet 26. Therefore, if the damper 20 rotates, the turbine hub 10 and the driven shaft 12 also rotate.

The coil spring 22 is disposed between the clutch piston 18 and an external circumferential portion of the damper 20, and allows the clutch piston 18 and the damper 20 to rotate relatively within a predetermined range. The coil spring 22 rotates with the clutch piston 18 and the damper 20.

The clutch piston 18 has a surface facing the front cover 2, and a friction member 28 is attached to the surface. The friction member 28 is made of a material having high durability and abrasion resistance and low thermal conduction rate.

A first hydraulic line 30 is formed between the front cover 2 and the turbine hub 10, and is connected to the disengagement-side oil chamber 32 formed at the space between the front cover 2 and the clutch piston 18.

In addition, a second hydraulic line 34 is formed between the impeller 4 and the stator 8, and a third hydraulic line 36 is formed between the turbine hub 10 and the stator 8.

The second hydraulic line 34 and the third hydraulic line 36 are connected to the engagement-side oil chamber 24 and are connected to each other through the engagement-side oil chamber 24.

The lock-up clutch 16 of the torque converter TC is a hydraulic clutch connecting the turbine 6 to the front cover 2 by hydraulic pressure difference between the engagement-side oil chamber 24 and the disengagement-side oil chamber 32. If the lock-up clutch 16 is engaged completely, the impeller 4 and the turbine 6 rotate integrally.

In addition, slip amount of the lock-up clutch 16 is feedback-controlled by difference between the hydraulic pressure of the engagement-side oil chamber 24 and the hydraulic pressure of the disengagement-side oil chamber 32 (that is, coupling torque).

The hydraulic control apparatus which can control the lock-up clutch 16 will be described in detail with reference to the accompanying drawings.

Figure 2:
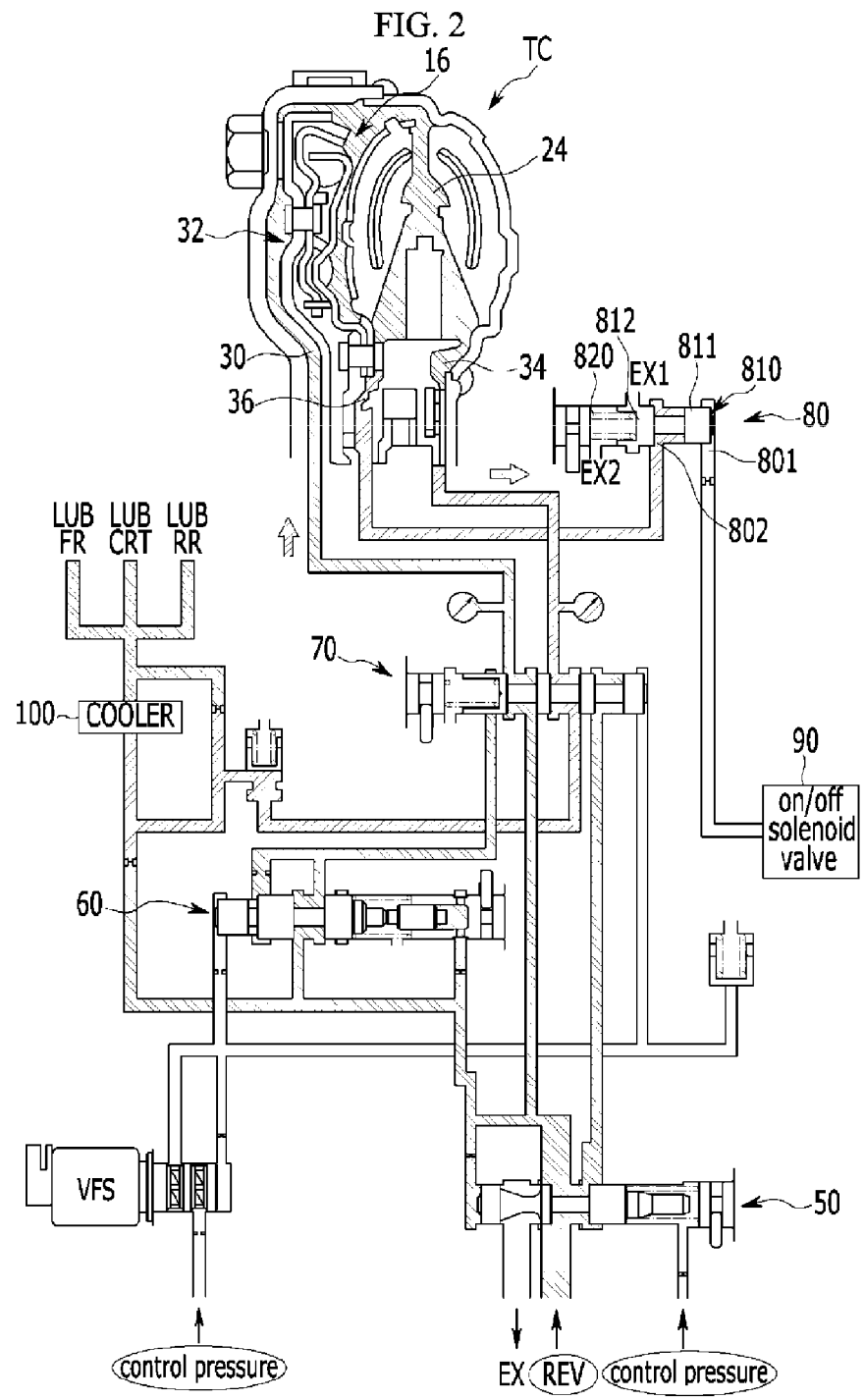
FIG. 2 is a schematic diagram illustrating a lock-up off state of a lock-up clutch in a hydraulic control apparatus according to an exemplary embodiment of the present invention.

FIG. 2 is a schematic diagram illustrating a lock-up off state of a lock-up clutch in a hydraulic control apparatus according to an exemplary embodiment of the present invention.

Referring to FIG. 2, the hydraulic pressure supplied to or exhausted from the torque converter TC is controlled by a torque converter control valve 50, a torque converter pressure control valve 60, a lock-up clutch switch valve 70, and a slip switch valve 80.

The torque converter control valve 50 may be a spool valve and is controlled by control pressure supplied from a proportional control solenoid valve. The torque converter control valve 50 reduces the hydraulic pressure supplied from a regulator valve REV and supplies line pressure to the torque converter TC for increasing torque of the torque converter TC when a vehicle increases speed and for improving fuel consumption when the vehicle runs with high speed.

The torque converter pressure control valve 60 may be a spool valve, and is controlled by the hydraulic pressure supplied from the torque converter control valve 50 and control pressure supplied from a proportional control solenoid valve VFS so as to control coupling pressure and releasing pressure of the lock-up clutch 16.

The lock-up clutch switch valve 70 may be a spool valve, and is controlled by the control pressure of the proportional control solenoid valve VFS so as to supply the hydraulic pressure to the lock-up clutch 16 or exhaust operating hydraulic pressure of the lock-up clutch 16.

The slip switch valve 80 may be a spool valve, and is controlled by control pressure supplied from an on/off solenoid valve 90 so as to selectively exhaust the operating hydraulic pressure of the lock-up clutch 16.

The slip switch valve 80 related directly to operation of an exemplary embodiment of the present invention among the valves 50, 60, 70, and 80 will be described in further detail.

The slip switch valve 80 includes a valve body provided with first and second ports 801 and 802 and first and second exhaust ports EX1 and EX2, a valve spool 810 provided with first and second lands 811 and 812, an elastic member 820.

The first port 801 is connected to the on/off solenoid valve 90 so as to receive the control pressure from the on/off solenoid valve 90.

The second port 802 is connected to the third hydraulic line 36 of the torque converter TC.

The first exhaust port EX1 selectively exhausts the hydraulic pressure supplied to the second port 802.

The second exhaust port EX2 exhausts the hydraulic pressure leaking from the slip switch valve 80.

The control pressure supplying to the first port 801 is applied to the first land 811.

The second land 812 selectively opens or closes the first exhaust port EX1.

In addition, the elastic member 820 may be a compressed coil spring, and is disposed between the second land 813 and the valve body so as to apply elastic force to the valve spool 810. The elastic force always pushes the valve spool 810 toward the first port 801.

The valve spool 810 is moved to the right in the drawing by the elastic force of the elastic member 820 so as to close the first exhaust port EX1 at a normal condition. Therefore, the hydraulic pressure of the second port 802 is prevented from being exhausted.

If the control pressure, on the contrary, is supplied to the first port 801, the valve spool 810 is pushed to the left in the drawing so as to open the first exhaust port EX1. Therefore, the hydraulic pressure supplied to the second port 802 is exhausted.

A case where the lock-up clutch 16 is not operated by the hydraulic control apparatus for a hydraulic torque converter according to an exemplary embodiment of the present invention is illustrated in FIG. 2.

That is, the drive pressure of the regulator valve REV is supplied to the disengagement-side oil chamber 32 through the torque converter control valve 50, the lock-up clutch switch valve 70, and the first hydraulic line 30 at a lock-up off state where the lock-up clutch 16 is not operated.

Therefore, the clutch piston 18 of the lock-up clutch 16 is pushed toward the turbine 6 by the hydraulic pressure and the friction member 28 moves away from the front cover 2. Therefore, the lock-up clutch 16 becomes the lock-up off state.

At this time, a portion of the hydraulic pressure supplied to the disengagement-side oil chamber 32 is exhausted through the second hydraulic line 34 and is circulated to the cooler 100 through the lock-up clutch switch valve 70. The hydraulic pressure is cooled by the cooler 100 and is supplied to lubrication portions of the automatic transmission.

In addition, the other portion of the hydraulic pressure is supplied to the slip switch valve 80 through the third hydraulic line 36, but is not exhausted because the first exhaust port EX1 is closed by the valve spool 810.

Figure 3:
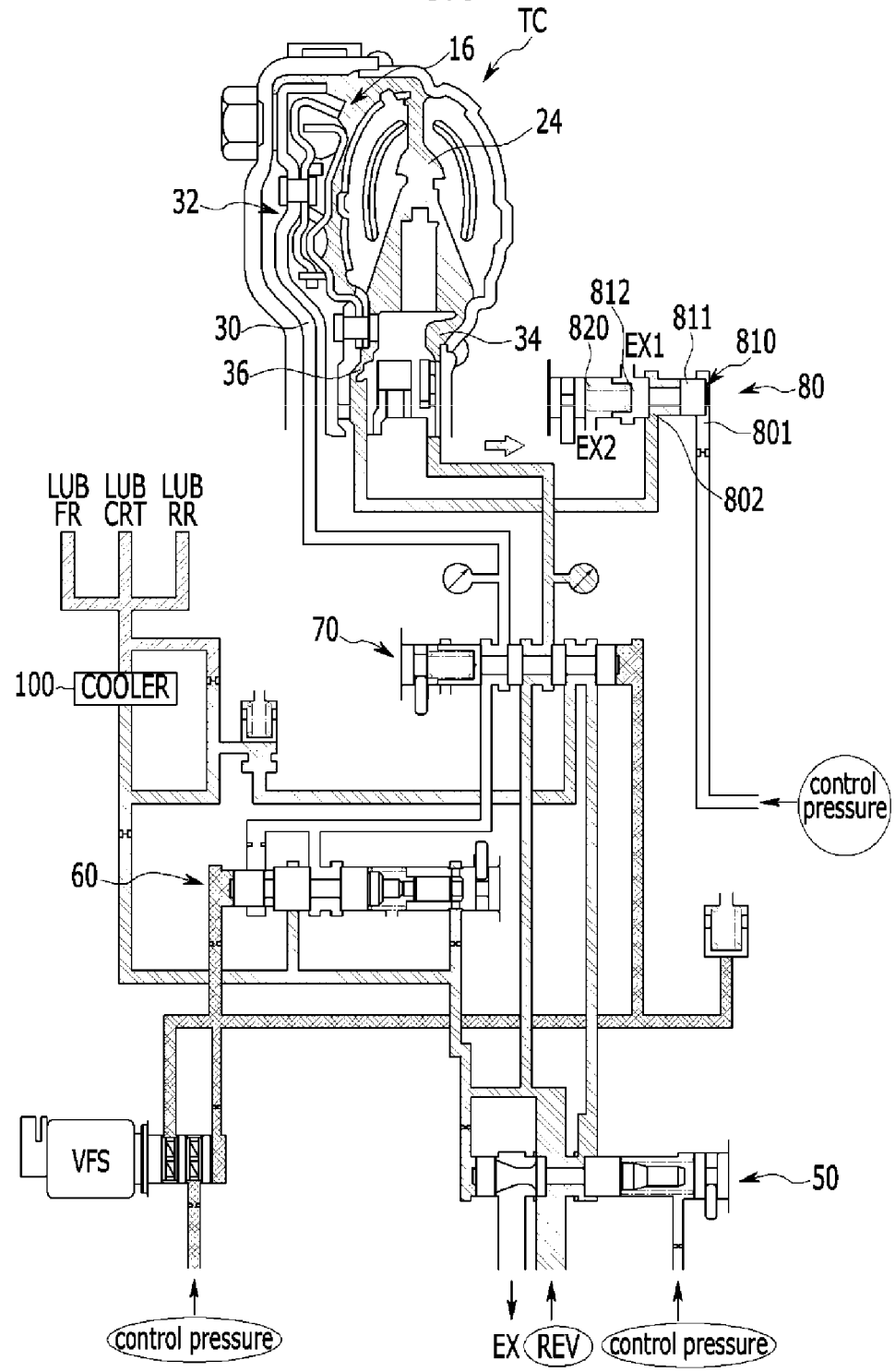
FIG. 3 is a schematic diagram illustrating a lock-up on state of a lock-up clutch in a hydraulic control apparatus according to an exemplary embodiment of the present invention.

FIG. 3 is a schematic diagram illustrating a lock-up on state of a lock-up clutch in a hydraulic control apparatus according to an exemplary embodiment of the present invention.

Referring to FIG. 3, the drive pressure of the regulator valve REV is supplied to the engagement-side oil chamber 24 through the torque converter control valve 50, the lock-up clutch switch valve 70, and the second hydraulic line 34 in a lock-up on state of the lock-up clutch 16.

Therefore, the piston 18 of the lock-up clutch 16 is pushed toward the front cover 2 by the hydraulic pressure and the friction member 28 is coupled to the front cover 2 by friction. Therefore, torque of the engine is mechanically input to the automatic transmission through the turbine 6 and the driven shaft 12.

At this time, the hydraulic pressure for lubrication is directly supplied from the lock-up clutch switch valve 70 to the cooler 100. The hydraulic pressure is cooled by the cooler 100 and is supplied to the lubrication portions of the automatic transmission.

In addition, a portion of the hydraulic pressure supplied to the engagement-side oil chamber 24 is supplied to the slip switch valve 80 through the third hydraulic line 36, but is not exhausted because the first exhaust port EX1 is closed by the second land 812 of the valve spool 810.

FIG. 4 is a schematic diagram illustrating a slip start state of a lock-up clutch in a hydraulic control apparatus of an exemplary embodiment of the present invention.

Referring to FIG. 4, in a slip start state of the lock-up clutch, the same as the lock-up on state of the lock-up clutch 16, the drive pressure of the regulator valve REV is supplied to the engagement-side oil chamber 24 through the torque converter control valve 50, the lock-up clutch switch valve 70, and the second hydraulic line 34.

Therefore, the clutch piston 18 of the lock-up clutch 16 is pushed toward the front cover 2 by the hydraulic pressure, and the friction member 28 is slowly coupled to the front cover 2 by friction.

In addition, a portion of the hydraulic pressure supplied to the engagement-side oil chamber 24 is supplied to the slip switch valve 80 through the third hydraulic line 36. Since the portion of the hydraulic pressure is exhausted through the slip switch valve 80, circulation of the hydraulic pressure is achieved.

That is, the control pressure of the on/off solenoid valve 90 is supplied to the first port 801 of the slip switch valve 80, and the valve spool 810 is moved to the left in the drawing in the slip start state of the lock-up clutch 16. Therefore, the second port 802 is connected to the first exhaust port EX1 and the portion of the hydraulic pressure in the engagement-side oil chamber 24 is exhausted.

Therefore, circulation of the fluid in the torque converter TC may be quickly achieved in the slip start state of the lock-up clutch 16 compared with the lock-up on state. Therefore, cooling performance may be improved, thermal degradation of the friction member may be prevented, and the durability of the lock-up clutch 16 may be improved.

In addition, operation of the lock-up clutch may be controlled suitably by the above-mentioned fluid flow.

Cooling performance may be improved and temperature rise of oil may be suppressed by circulating fluid when slip start of the lock-up clutch according to an exemplary embodiment of the present invention. Therefore, durability of the lock-up clutch may be improved and operation of the lock-up clutch may be controlled suitably.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic control apparatus for a hydraulic torque converter which is provided with a lock-up clutch operated or not by hydraulic pressure difference between an engagement-side oil chamber and a disengagement-side oil chamber, the hydraulic control apparatus comprising:
    a first hydraulic line supplying hydraulic pressure to the disengagement-side oil chamber or exhausting the hydraulic pressure from the disengagement-side oil chamber;
    a second hydraulic line supplying hydraulic pressure to the engagement-side oil chamber or exhausting the hydraulic pressure from the engagement-side oil chamber; and
    a third hydraulic line exhausting the hydraulic pressure exhausted from the second hydraulic line;
    a lock-up clutch switch valve supplying drive pressure supplied from a regulator valve through a first path selectively to the first hydraulic line or the second hydraulic line, and selectively supplying the hydraulic pressure exhausted from the second hydraulic line or the drive pressure supplied from the regulator valve through a second path to a cooler; and
    a slip switch valve directly receiving the hydraulic pressure exhausted from the third hydraulic line and selectively exhausting the hydraulic pressure exhausted from the third hydraulic line.

2. The hydraulic control apparatus of claim 1, wherein the slip switch valve is configured to switch hydraulic line by moving a valve spool by control pressure of an on/off solenoid valve.

3. The hydraulic control apparatus of claim 1, wherein the slip switch valve includes:
    a valve body provided with a first port receiving the control pressure from an on/off solenoid valve, a second port connected to the third hydraulic line of the engagement-side oil chamber, a first exhaust port selectively exhausting the hydraulic pressure supplied to the second port, and a second exhaust port exhausting hydraulic pressure leaking from the slip switch valve; and
    a valve spool provided with a first land to which the control pressure supplied to the first port is applied, a second land selectively opening or closing the first exhaust port, and an elastic member disposed between the second land and the valve body and elastically biasing the valve spool toward the first port.

4. The hydraulic control apparatus of claim 1, further including:
    a torque converter control valve receiving drive pressure from the regulator valve;
    the lock-up clutch switch valve supplying the drive pressure supplied from the torque converter control valve selectively to the engagement-side oil chamber or the disengagement-side oil chamber; and
    the cooler cooling hydraulic fluid of the hydraulic torque converter.

5. The hydraulic control apparatus of claim 4, wherein the drive pressure of the regulator valve is supplied to the disengagement-side oil chamber through the torque converter control valve, the lock-up clutch switch valve, and the first hydraulic line in a lock-up off state of the lock-up clutch.

6. The hydraulic control apparatus of claim 5, wherein a portion of the hydraulic pressure supplied to the disengagement-side oil chamber is exhausted through the second hydraulic line so as to be recirculated to the cooler through the lock-up clutch switch valve.

7. The hydraulic control apparatus of claim 5, wherein a portion of the hydraulic pressure supplied to the disengagement-side oil chamber is supplied to the slip switch valve through the third hydraulic line, but is not exhausted through the slip switch valve.

8. The hydraulic control apparatus of claim 4, wherein the drive pressure of the regulator valve is supplied to the engagement-side oil chamber through the torque converter control valve, the lock-up clutch switch valve, and the second hydraulic line in a lock-up on state or a slip start state of the lock-up clutch.

9. The hydraulic control apparatus of claim 8, wherein hydraulic pressure for lubrication is supplied directly from the lock-up clutch switch valve to the cooler in the lock-up on state of the lock-up clutch.

10. The hydraulic control apparatus of claim 8, wherein a portion of the hydraulic pressure supplied to the engagement-side oil chamber is supplied to the slip switch valve through the third hydraulic line, but is not exhausted through the slip switch valve in the lock-up on state of the lock-up clutch.

11. The hydraulic control apparatus of claim 8, wherein a portion of the hydraulic pressure supplied to the engagement-side oil chamber is supplied to the slip switch valve through the third hydraulic line, and is then exhausted through the slip switch valve in the slip start state of the lock-up clutch.

* * * * *